B. D. STEVENS.
FEED ROLL FOR PLANERS.
APPLICATION FILED JUNE 26, 1908.
913,924.
Patented Mar. 2, 1909.
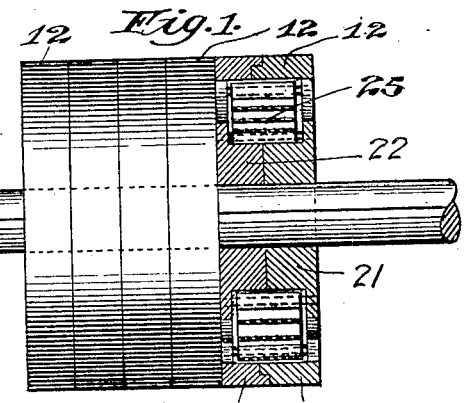
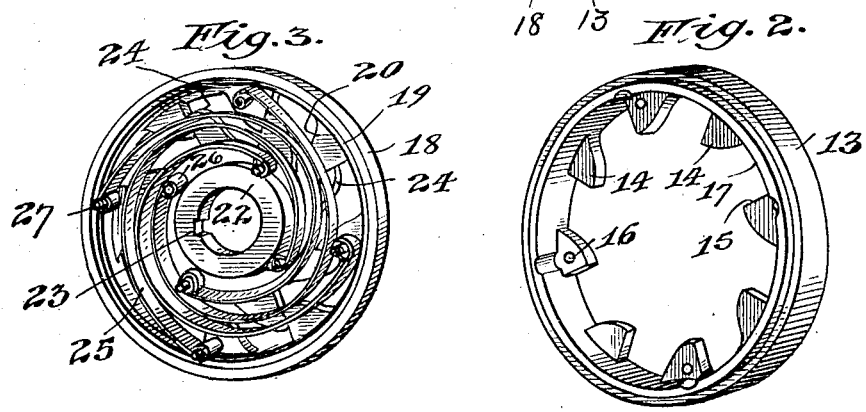
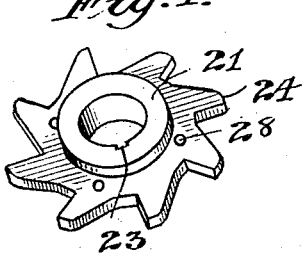
Witnesses,
Inventor,
Burt D. Stevens
By Offield Towle & Linthicum
Atty's.

UNITED STATES PATENT OFFICE.

BURT D. STEVENS, OF BELOIT, WISCONSIN, ASSIGNOR TO THE BERLIN MACHINE WORKS, OF BELOIT, WISCONSIN, A CORPORATION OF WISCONSIN.

FEED-ROLL FOR PLANERS.

No. 913,924.     Specification of Letters Patent.     Patented March 2, 1909.

Application filed June 26, 1908. Serial No. 440,524.

*To all whom it may concern:*

Be it known that I, BURT D. STEVENS, a citizen of the United States, residing at Beloit, in the county of Rock and State of Wisconsin, have invented certain new and useful Improvements in Feed-Rolls for Planers, of which the following is a specification.

My invention constitutes an improvement in sectional spring-mounted feed-rolls for planing-machines of the type and style set forth in United States Patent No. 771,501, granted October 4, 1904, to Harry B. Ross, for improvements in feed rolls for planing machines. In such a device it is desirable to have the C-shaped springs longer than those indicated in the Ross patent, in order to secure a maximum of elasticity for the springs and flexibility or spring-yielding for the rolls. It is practically impossible to use longer springs, however, in the Ross construction, owing to the manner in which they have to be inserted between the inner driving member and the outer shell roll. There are two ways of putting these springs in place. By one method the inner ends of the springs are fastened to the driver, and then the latter and the exterior roll are assembled, the overlapping springs being first wrapped around the driver as closely as possible so as to occupy a minimum amount of space. The springs when thus compressed occupy a space of sufficiently small diameter to escape the inner ends of the inwardly-projecting driving teeth of the roll. If the longer desirable springs were used, the space which they would take up when overlapped and compressed would be of too great a diameter to permit their passing by the teeth of the outer roll. Furthermore, this method of inserting the springs is objectionable because of the liability of giving them a permanent detrimental set. The other method of positioning the springs is to assemble one section or half of the driver and the roll, and then by twisting and careful and tedious manipulation of the springs, threading or inserting them in place from the side of the united structure avoiding the teeth or lugs. This is a difficult operation even with springs of the length indicated in the Ross patent, and such method is practically barred when the insertion of longer springs is attempted.

By the employment of my improved construction, the person assembling the parts of the device encounters no difficulties, and considerably longer springs are readily put in place. In accordance with my invention, the roll and inner driver are both split in halves transversely, which permits the springs to be put in place, and held in position by their pins, bolts or the like in one section, or half of the roll and driver, the remaining halves or parts of the roll and driver being readily fitted to the other assembled parts. In assembling the portions or parts of the construction in this manner the springs are not unduly compressed and all likelihood of producing permanent set is avoided. Furthermore, no such dexterity or care is needed as with the Ross construction. In order that the two halves of the roll may properly register when brought together, the one may be supplied with a circular flange, while the other may have a groove or recess of corresponding size and shape to receive the same. The key on the shaft, in conjunction with the keyways of the two parts of the driver, determines their proper register and position.

On the accompanying drawing, I have illustrated my preferred embodiment of the invention, the same parts in the different views being supplied with like reference characters.

On this drawing,—Figure 1 shows the driving shaft with three flexibly-mounted roll-sections applied thereto, the right-hand roll being in central section; Fig. 2 illustrates in perspective one half or section of the exterior shell or feed roll; Fig. 3 is a perspective view of the other half of the exterior feed roll, the plurality of springs positioned in the same, and a half of the inner driver; and Fig. 4 illustrates in perspective the remaining half or portion of the driver.

Referring to the drawings, it will be noted that the driving shaft 10 is provided with a longitudinal key 11, and has mounted thereon a plurality of flexibly-mounted feed-rolls 12—12—12, which unitedly and in combination form a feed roller of substantial size and length. Each of these sectional feed-rolls has an outer shell or hollow feed-roll 13 supplied on its outer edge with a plurality of inwardly-projecting teeth or driving lugs 14, each of which has at least one straight flat edge 15. Also the alternate lugs or teeth 14 in the present instance are perforated or provided with apertures 16 adapted to accommodate the ends of the pins which hold the springs in place. The inner edge of this circular feed-roll 13 has a circular flange or rib 17 for a purpose hereinafter indicated.

The companion half or section 18 of the shell or hollow feed-roll is substantially the same as the half 13 except that the parts are reversed, and instead of having a circular flange or rib 17, it is supplied with a corresponding groove 19 adapted to receive the flange 17 and cause the proper register of the two parts of the feed roll when assembled. As indicated, the half feed-roll 18 has driving lugs 20, a portion of which are apertured like those indicated in Fig. 2 to receive the ends of the pins or rods which hold the springs in place.

The driver, which is also transversely divided in the middle, comprises two parts 21 and 22, each provided with a key slot 23 adapted to accommodate and receive the key 11, which holds the two parts of the driver from rotation on the shaft 10 and causes their proper register one with the other. On its outer edge each driving section 21 and 22 has a plurality of outwardly-extending teeth or driving lugs 24 adapted to bear against the lugs or teeth 14 and 20 of the feed roll to transmit the rotation of the shaft 10 to the latter.

As in the Ross construction mentioned above, the feed roll is equipped with a number of elastic, flexible C-shaped springs 25, the inner ends of which are bent around to receive pins 26, while their outer ends are bent around similar pins or rods 27, the ends of which are held in the apertures of the lugs 14 and 20. To properly assemble the parts of this sectional feed-roller, one of the driving sections, such as 22, is slid on to the shaft 10, its key-way 23 accommodating the key 11. The outer shell or feed roll 18 is placed over the same, with the teeth of the two parts in contact. The ends of the pins 26 are placed in the apertures or holes 28 of the inner driving member, while the ends of similar pins 27 are placed in the apertures 16 of the teeth 14. Then the springs 25 can be readily placed in proper position, their bent inner and outer ends being placed over the pins or rods 26 and 27, respectively. After these parts have been assembled in the manner indicated, and as illustrated in Fig. 3, no difficulty is encountered in placing the other driving member 21 on the shaft in proper relation so that its apertures 28 will receive the protruding ends of the pins or rods 26, and the feed shell or roller 13 may also be easily placed in proper position so that its apertures 16 will receive the ends of the rods or pins 27, the two parts of the roller 13 and 18 being brought to proper register by the coöperating circular flange and groove 17 and 19.

It will be apparent that by splitting the parts of each sectional roll as has been fully described and illustrated, the springs may be placed in position without difficulty and without likelihood of damage to their flexibility or elastic characteristics. Furthermore, to those skilled in the art it will be apparent that springs of substantially any practical length may be used in rollers of this kind, thereby increasing the elasticity of the mounting for the feed rollers without in any way rendering more difficult the insertion of the springs in proper place.

This invention is susceptible of considerable structural variation as to the number and length of springs and the mode of connecting them to the inner and outer sections, and also as to the construction of the driving member and feed roll, without departure from the substance and heart of the invention.

I claim:

1. A sectional feed roll comprising in combination a driving shaft provided with driving connections rigid therewith, an outer transversely-divided roll section provided with coöperating driving connections, one or more spiral or C springs disposed between and secured to said shaft and outer roll section, and arranged substantially co-axially with said driving shaft and means to maintain the parts of said outer roll section in matched relation or register, substantially as described.

2. A feed-roll comprising in combination a driving shaft provided with two sets of outwardly-extending driving projections or lugs rigid therewith, an outer roll with two sets of inwardly-projecting lugs or fingers coöperating with said driving projections or lugs, one or more spiral or C springs disposed between said groups of lugs or projections and secured to said shaft and outer roll, the latter being divided transversely between said sets of lugs or fingers and means to maintain the parts of said outer roll in matched relation or register, substantially as described.

3. A feed roll comprising in combination a driving shaft provided with two sets of outwardly-extending driving projections rigid therewith, an outer roll with two groups of inwardly-projecting lugs coöperating with said driving projections, and one or more spiral or C springs disposed between said groups of projections and lugs and secured to said shaft and outer roll, the latter being divided transversely between its sets of lugs, the parts of said roll having means to provide proper register thereof when brought together, substantially as described.

4. A feed roll comprising in combination a driving shaft with two sets of outwardly-extended driving projections rigid therewith, an outer roll with two sets of inwardly-projecting lugs coöperating with said driving projections, and one or more spiral or C springs disposed between said sets of lugs and projections and secured to said shaft and outer roll, the latter being divided transversely between its sets of lugs, one portion of said outer roll having a circular flange and the other a circular groove adapted to receive said flange and cause the proper register of the two parts of the roll when brought together, substantially as described.

5. A feed roll comprising in combination a driving shaft, a transversely divided driver secured to said shaft and provided with driving connections rigid therewith, an outer transversely-divided roll supplied with coöperating driving connections, one or more spiral or C springs disposed between and secured to said driver and outer roll and arranged substantially co-axially with said shaft, and means to maintain the parts of said outer roll in matched relation or register, substantially as described.

6. A feed roll comprising in combination a driving shaft, a driver secured to said shaft and supplied with two sets of outwardly-extended driving projections rigid therewith, the driver being divided transversely between said sets of projections, an outer roll having two sets of inwardly-projecting lugs coöperating with said driving projections or lugs, said outer roll being divided transversely between its sets of lugs, one or more spiral or C springs disposed between and secured to said driver and outer roll between their sets of driving projections and lugs and arranged substantially co-axially with said driving shaft and means to maintain the parts of said outer roll in matched relation or register, substantially as described.

7. A feed roll comprising in combination a driving shaft, a driver secured to said shaft and having two sets of outwardly-extended driving projections rigid therewith, said driver being divided transversely between said sets of projections, an outer roll supplied with two sets of inwardly-projecting lugs coöperating with said driving projections, said roll being divided transversely between its two sets of lugs, one or more spiral or C springs disposed between said projections and lugs and secured to said outer roll and said driver and arranged substantially co-axially with said shaft, the parts of said roll being supplied with means to cause their proper register when brought together, and means to cause the proper register of the parts of said driver when they are assembled, substantially as described.

8. A feed roll comprising in combination a driving shaft, a driver secured to said shaft and having two sets of outwardly-extended driving projections rigid therewith, a portion of which at least are apertured, said driver being transversely divided between its sets of projections, an outer roll equipped with two sets of inwardly-projecting lugs coöperating with said driving projections, a portion at least of said lugs being apertured, said roll being transversely divided between its sets of lugs, pins or rods having their ends fitted in the apertures of the lugs of said outer roll, other pins having their ends fitted in the apertures of the driving projections of said driver, a plurality of spiral or C springs disposed between said sets of projections and lugs and having their opposite ends secured to said pins, and means to cause the proper register of the parts of said roll and driver when brought together, substantially as described.

BURT D. STEVENS.

Witnesses:
  LAURA ROSS,
  F. A. HORSTMANN.